United States Patent
Meister et al.

(10) Patent No.: US 10,496,985 B2
(45) Date of Patent: Dec. 3, 2019

(54) LOADING AND DISBURSEMENT OF AN ELECTRONIC AMOUNT OF MONEY

(71) Applicant: GIESECKE & DEVRIENT GMBH, Munich (DE)

(72) Inventors: Gisela Meister, Munich (DE); Jan Eichholz, Munich (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 1062 days.

(21) Appl. No.: 14/435,490

(22) PCT Filed: Oct. 11, 2013

(86) PCT No.: PCT/EP2013/003091
§ 371 (c)(1),
(2) Date: Apr. 14, 2015

(87) PCT Pub. No.: WO2014/060090
PCT Pub. Date: Apr. 24, 2014

(65) Prior Publication Data
US 2015/0302399 A1      Oct. 22, 2015

(30) Foreign Application Priority Data
Oct. 15, 2012   (DE) .................. 10 2012 020 234

(51) Int. Cl.
*G06Q 20/36*      (2012.01)
*G06Q 20/38*      (2012.01)

(52) U.S. Cl.
CPC ..... *G06Q 20/3678* (2013.01); *G06Q 20/3829* (2013.01)

(58) Field of Classification Search
CPC ... G06F 21/34; G06F 21/604; G06Q 20/3825; G06Q 30/012; G06Q 30/0601; G06Q 20/3823; G06Q 20/34785
See application file for complete search history.

(56) References Cited

U.S. PATENT DOCUMENTS

| | | | |
|---|---|---|---|
| 8,549,279 B1 * | 10/2013 | Sahasranaman | H04L 67/02 705/64 |
| 2002/0130175 A1 | 9/2002 | Nakajima | |
| 2003/0135473 A1 | 7/2003 | Lang et al. | |
| 2004/0111380 A2 | 6/2004 | Lang et al. | |

(Continued)

FOREIGN PATENT DOCUMENTS

| | | |
|---|---|---|
| DE | 10020565 A1 | 10/2001 |
| EP | 1887458 A1 | 2/2008 |

OTHER PUBLICATIONS

German Examination Report for corresponding German Application No. 102012020234.2, dated Jun. 19, 2013.

(Continued)

*Primary Examiner* — Johann Y Choo
(74) *Attorney, Agent, or Firm* — Workman Nydegger

(57) ABSTRACT

The invention creates a method for loading an electronic amount of money represented as a random number sequence to a portable data carrier, with a conversion of the random number currency to the data carrier currency, and a disbursement of one or several money unit(s) from a portable data carrier, with a conversion of the data carrier currency to the random number currency.

12 Claims, 1 Drawing Sheet

Loading chip card

(56) References Cited

U.S. PATENT DOCUMENTS

| | | | |
|---|---|---|---|
| 2008/0077794 A1* | 3/2008 | Arnold | H04L 9/0822 |
| | | | 713/169 |
| 2008/0230601 A1 | 9/2008 | Suzuki et al. | |
| 2008/0262969 A1 | 10/2008 | Samid | |
| 2009/0007065 A1* | 1/2009 | Becker | G06F 8/443 |
| | | | 717/110 |
| 2009/0048979 A1* | 2/2009 | Al-Herz | G06Q 20/06 |
| | | | 705/67 |
| 2009/0178112 A1* | 7/2009 | Doman | G06F 21/35 |
| | | | 726/1 |
| 2010/0150352 A1* | 6/2010 | Mansour | H04L 9/003 |
| | | | 380/281 |
| 2010/0250949 A1* | 9/2010 | Torino | H04L 63/0823 |
| | | | 713/176 |
| 2010/0325435 A1* | 12/2010 | Park | H04L 9/0844 |
| | | | 713/171 |
| 2013/0304642 A1* | 11/2013 | Campos | G06Q 20/36 |
| | | | 705/41 |

OTHER PUBLICATIONS

International Search Report for corresponding International PCT Application No. PCT/EP2013/003091, dated Dec. 19, 2013.

* cited by examiner

Loading chip card

Paying with chip card

LOADING AND DISBURSEMENT OF AN ELECTRONIC AMOUNT OF MONEY

BACKGROUND

The invention relates to a method for loading an electronic amount of money represented by a random number sequence, to a portable data carrier, and a method for disbursing an amount of money from the data carrier.

Prepaid cards are known for loading an electronic amount of money to a credit account for mobile telephones. After payment of the amount of money to the trader, the buyer is handed the prepaid card. The buyer uncovers a credit code applied in covered fashion to the prepaid card and transmits the credit code to his mobile communication network operator, stating his mobile telephone number. The network operator tops up the credit account associated with the mobile telephone number by the amount of money.

Electronic wallets (e-wallet, electronic purse) are known for paying small amounts of money. There exist electronic wallets implemented in chip cards, such as e.g. the German cash card. Further, electronic wallets are known which are implemented as applications in mobile terminals, such as e.g. mobile telephones, smart phones, PDAs and the like.

A typical electronic wallet, e.g. the German cash card, has a dual structure, with a local wallet account in a portable data carrier, e.g. in a chip card or in a chip in the mobile terminal, and a shadow account on a background server. To credit an amount of money to the wallet, a payment is effected to the background server, e.g. in cash or with a payment transaction card. In response to the payment, the paid amount is credited to the shadow account and the wallet account. When an amount of money is paid with the wallet, the amount of money is first debited from the wallet account and subsequently, possibly also much later, the shadow account is adjusted, i.e. the amount of money is debited also from the shadow account.

There is a plurality of micro payment systems for paying (predominantly) small electronic amounts of money.

In the so-called Bitmint concept for a micro payment system, a buyer obtains a character sequence (bit string) in exchange for the payment of an amount of money, the character sequence corresponding to the amount of money. An amount of money of x cents is represented in Bitmint by a random number of a length of x*N bytes, e.g. with N=32 bytes. FIG. 3 schematically shows an implementation possibility for a typical Bitmint character sequence. In the implementation possibility suggested in FIG. 3, the amount of money is represented as a sequence of random numbers. The smallest available unit 1 cent is represented by a random number of a length of N (e.g. 32) bytes. An amount of money of x cents is represented by a sequence of random numbers RND which consists of a concatenation of the x arrayed random numbers RND0, RND1, . . . , RNDx of the x individual cents, the random numbers having a length of N bytes. Besides the sequence of random numbers RND which represents the amount of money, the character sequence comprises a position field POS, where the start position POSS and length POSL of the random number RND are specified. By means of the position field POS, the random number can be divided in order to divide the total amount into partial amounts, in order to return change for example. The total amount is specified by the start position POSS at the start of the random number sequence RND and the length POSL total length of the random number sequence. Partial amounts are represented by selected values of the position POSS and the length POSL. Optionally, the character sequence comprises an index IN facilitating administration, and an attribute field AT.

It would be desirable to be able to carry along electronic Bitmint money in an electronic wallet. In order to store a larger amount of money in Bitmint, a multiplicity of long random numbers must be stored. The typically available memory space of a chip card or of a wallet application in a mobile terminal is not sufficient for this.

SUMMARY

It is the object of the invention to specify a secure and efficient method for loading an electronic amount of money represented by a random number sequence to a portable data carrier. Further, a method is to be specified for paying with the data carrier by disbursing the amount of money or a partial amount thereof again from the data carrier.

The method according to claim 1 is adapted to load an electronic amount of money represented by a random number sequence to a portable data carrier. The amount of money is formed by a predetermined number of money units. The random number sequence is formed by an array of the same number of random numbers as the number of money units of which the amount of money consists.

The method is characterized in that
- the random number sequence has been generated by a, particularly cryptographically secure, pseudo random-number generator wherein the random number sequence (i.e. the individual random numbers) has been generated on the basis of at least one secret key,
- in the data carrier, a, particularly cryptographically secure, pseudo random-number generator is implemented, by means of which random numbers can be generated on the basis of at least the secret key, and
- the amount of money is loaded to the portable data carrier by so storing the number of money units and the secret key in the portable data carrier that, by means of the pseudo random-number generator implemented in the data carrier and by using the stored money units and the stored secret key, the random number sequence can be generated and can be output from the data carrier.

Outside of the data carrier, the amount of money is represented as a random number sequence generated with a secret key, for example in the form of Bitmint currency. On a server, the storing of the memory-intensive random number sequence is easily possible, since the server has a high memory capacity. Upon storing the amount of money in the data carrier, merely the money units are stored. in so doing, a money unit requires only one single bit memory space. In contrast, the random number would require a memory space corresponding to its length, for example 32 bytes. Accordingly, by the storing according to the invention, an amount of money represented as a random number sequence can be stored in memory-space saving fashion. On the other hand, the random number sequence associated with the loaded amount of money can be generated again using the pseudo random-number generator implemented in the data carrier and the secret key. Accordingly, the amount of money can be disbursed again from the data carrier in the original currency in the form of a random number sequence. The random number sequence is thus not lost and irreversibly destroyed, but stored in such a fashion that it can actually be restored.

A method according to the invention for disbursing at least a partial amount of an amount of money from a portable data carrier to which the amount of money has been loaded using the above-specified method, is characterized in that by means of the pseudo random-number generator implemented in the data carrier and by using the stored money units and the stored secret key, the random number sequence is generated and output from the data carrier, and the number of money units that corresponds to the partial amount is deleted in the data carrier.

Accordingly, in the method the partial amount is present again outside of the data carrier in the original form as a random number sequence and can be used for paying. The partial amount is removed in the data carrier.

The complete amount of money or a part thereof can be provided as at least partial amount.

As data carrier, there is optionally provided: a chip card, a microprocessor token in a form that differs from the chip-card form, a mobile terminal, in particular a mobile telephone, smart phone, PDA.

Optionally, the secret key is individual to the data carrier. Thereby the data carrier associated with the random number sequence is uniquely determined by the random number sequence.

Optionally, a unique identifier is allocated to the data carrier, wherein the random numbers of the random number sequence have been or are generated on the basis of at least the secret key and the unique identifier of the data carrier. As identifier, for example a hash value can be provided over an information item that is specific to the data carrier. As specific information, in particular the individual secret key of the data carrier can be provided, so that the hash value over the individual secret key of the data carrier is thus used as identifier. For security reasons, the secret key should not be transmitted in plain text, e.g. to a background system. The secret key would also be suitable as identifier in principle.

Optionally, the data carrier is designed as an electronic wallet. A wallet account is set up in the data carrier in this case. Additionally, in a credit server of a background system a shadow account is set up which is allocated to the wallet account. In the method, the amount of money is additionally loaded to the shadow account by storing the random number sequence in the credit server.

Optionally, the secret key of the data carrier has been or is stored in the background system, in particular the credit server. In case an identifier is provided, the former has been or is optionally also stored in the background system, in particular the credit server.

Preferably, when a plurality of wallets is administrated by the background system, each wallet has an individual secret key and possibly individual identifier. Thus a unique allocation exists between money units represented as random number sequences and data carriers.

Optionally, the partial amount disbursed according to the invention from the data carrier is passed to the background system, wherein, in the credit server, the partial amount is debited from the shadow account. In particular, the partial amount is debited from the shadow account by deleting the random number sequence in the shadow account or marking it as used.

Optionally, the secret key or/and possibly the identifier are also output together with the disbursed partial amount and passed to the background system. Optionally, the shadow account associated with the data carrier is selected in the background system by means of the secret key and/or by means of the identifier.

In combination with a secret key and possibly identifier that are individual to the data carrier, it is additionally achieved that an amount of money to be debited can be debited exclusively from the correct shadow account associated with the data carrier. The shadow accounts of other data carriers cannot be influenced by the amount of money, since different secret keys are allocated to different data carriers.

Consequently, the loading and disbursing of amounts of money according to the invention is advantageous especially for such electronic wallets which have a local wallet account and a shadow account in a background system that is administrated in parallel, for example for loading and disbursing money into or from a cash card. The method according to the invention offers increased security for such wallets.

The electronic wallet can optionally be implemented e.g.: in a chip card, e.g. as a cash card; or in a token; or in a mobile terminal.

Optionally, the secret key is determined by the background system and stored in the data carrier by the background system, if required.

Optionally, the secret key is determined by key agreement between the background system and the data carrier and stored within the framework of the key agreement both in the data carrier and in the background system, so that it is available in the background system and in the data carrier. The key agreement can be carried out optionally by an authentication procedure with key agreement. Optionally, the key agreement is carried out by means of any one of the following procedures: EAC according to EN 14890; OPACITY GICS; GP. The procedures are procedures that are known per se for key agreement, possibly involving authentication. Optionally, as secret key a session key is determined in accordance with a key agreement protocol, thus a key that is valid only for one "session", i.e. for loading money and disbursing money once.

A payment transaction system according to the invention comprises a data carrier and a background system as described above. In the data carrier a secret key is stored, and there is implemented in said data carrier a, particularly cryptographically secure, pseudo random-number generator by means of which random numbers can be generated on the basis of at least the secret key, using the above-described method.

BRIEF DESCRIPTION OF THE DRAWINGS

In the following the invention will be explained in more detail on the basis of exemplary embodiments and with reference to the drawing, in which there are shown.

DETAILED DESCRIPTION OF VARIOUS EMBODIMENTS

Figure 1:
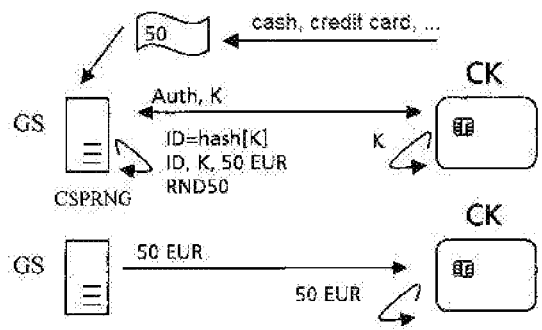
FIG. 1 a loading according to the invention of an amount of money to a data carrier.

FIG. 1 shows a loading of an amount of money represented in Bitmint currency, to an electronic wallet designed as a chip card CK, according to an embodiment of the invention. In the chip card CK a wallet account is set up. On a credit server GS of a background system a shadow account is set up that is allocated to the wallet account. In the background system and in the chip card respectively a pseudo random-number generator CSPRNG is implemented. On the shadow account and the wallet account respectively a total credit in the same amount is registered. In order to load an amount of money of EUR 50 to the electronic wallet, EUR 50 are paid in advance to the credit server GS in cash, by credit card or in any other fashion. In so doing, the electronic wallet or chip card CK is designated. Upon the advance payment, the agreement of a session key K between the chip card CK and the credit server GS is prompted and carried out. The session key K is stored in the chip card CK and in the background system. The credit server GS additionally forms an identifier ID from the hash value hash[K] over the session key K and stores it. With the pseudo random-number generator CSPRNG and the session key K, the background system generates a random number sequence RND50 from the loaded amount of EUR 50 and stores it. Thereby a new total credit that is increased by EUR 50 is generated on the shadow account. Additionally, the background system sends the loaded amount of EUR 50 to the chip card, the credit of which is increased by EUR 50. In FIG. 1 the total credit equals the loaded amount of EUR 50, i.e. the chip card CK was empty before. Alternatively, the chip card CK can have an old total credit before the loading and a total credit increased by the loaded amount after the loading.

Figure 2:
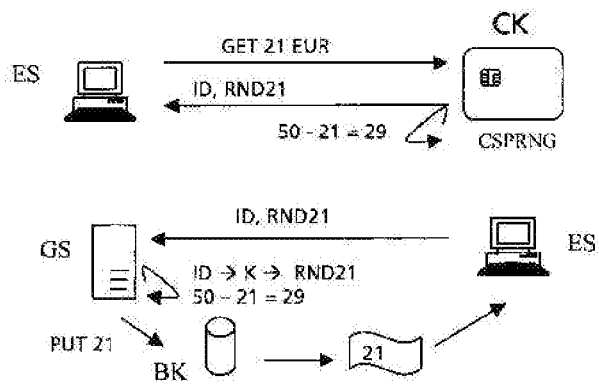
FIG. 2 a disbursement according to the invention of money units from the data carrier of FIG. 1.

FIG. 2 shows a disbursement of money units from the chip card CK of FIG. 1, according to an embodiment of the invention. The owner of the credit account of FIG. 1 wants to order from his PC goods of a value of EUR 21 in the Internet, from the online shop of the recipient, and wants to pay by means of the wallet chip card CK. For this purpose, he operates the chip card CK in the card reader of the PC. He specifies wallet as means of payment at the PC, and clicks on "buy now" at the PC, thereby sending an order confirmation to the recipient. The recipient operates a recipient server ES which is adapted to communicate with electronic wallets and recognizes the mode of payment wallet. In response thereto, the recipient server ES sends to the owner a payment request in the amount of EUR 21, comprising a command "GET 21 EUR" directed at the wallet/chip card CK. The chip card CK processes the command GET 21 EUR. Subsequently, the pseudo random-number generator CSPRNG implemented in the chip card generates a random number sequence RND21 corresponding to the amount of EUR 21 to be paid, deletes the EUR 21 locally and sends the random number sequence RND21 and the identifier ID to the recipient server ES. Internally, in the chip card CK the total credit is thus decreased by EUR 21 from EUR 50 to EUR 29 in so doing. The recipient server ES sends the random number sequence RND21 and the identifier ID to the credit server GS of the chip card CK. The credit server administrates a multiplicity of chip cards such as the chip card CK. The credit server GS picks the correct chip card CK and the correct session key K by means of the identifier ID. Subsequently, using the session key K, the credit server GS releases the payment amount in the amount of EUR 21 from the shadow account allocated to the identifier ID by invalidating a random number sequence RND21 that corresponds to EUR 21. Finally, in a known per se manner, the credit server GS prompts the payment of EUR 21 to the recipient (symbolic command "PUT 21"), e.g. to a bank server BK administrating an account of the recipient.

Figure 3:
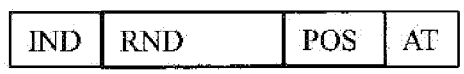
FIG. 3 an implementation possibility of a Bitmint money amount.

FIG. 3 shows the structure of an amount of money in the Bitmint currency. An indicator IND designates e.g. an individual wallet account. An attribute field AT offers the possibility to specify additional information such as e.g. an appropriation of an amount of money. The random number sequence RND and the position field POS form the actual amount of money. The random number sequence RND consists of a concatenation (array) of i random numbers RNDi. The number i of random numbers equals the number i of money units in the represented amount of money. By specifying a start position greater than zero and a length smaller than i in the position field, partial amounts of the amount of money can be specified.

The invention claimed is:

1. A method for loading an electronic amount of money represented by a pseudo random number sequence (RND) to a portable data carrier (CK), the portable data carrier comprising its own microprocessor and cryptographically secure processing environment, the method comprising:
   determining an amount of money to be represented by a pseudo random number sequence (RND);
   generating, by a cryptographically secure, pseudo random-number generator (CSPRNG), the pseudo random number sequence (RND), wherein the pseudo random number sequence (RND) is generated based on at least one secret key (K), such that the secret key (K) is provided to the CSPRNG as at least one initial value for generating the pseudo random number sequence RND, wherein the amount of money is represented by a predetermined number of money units, each individual money unit of the predetermined number of money units equaling a given sub-amount of the amount of money such that totaling each of the individual money units together equals the amount of money and the pseudo random number sequence (RND) includes an array of pseudo random numbers equal in amount to the number of money units;
   generating each section of the array of pseudo random numbers by placing a pseudo random number representing each individual money unit of the predetermined number of money units into a given slot of the array that corresponds to the sub-amount of each individual money unit; and
   loading the amount of money to the portable data carrier (CK) by so storing the predetermined number of money units and the secret key (K) in the portable data carrier (CK).

2. The method according to claim 1, wherein by means of the pseudo random-number generator (CSPRNG) implemented in the data carrier (CK) and by using the stored money units and the stored secret key (K), the pseudo random number sequence (RND) is generated and output from the data carrier (CK) and the number of money units which corresponds to the partial amount is deleted in the data carrier (CK).

3. The method according to claim 1, wherein the secret key (K) is individual to the data carrier (CK).

4. The method according to claim 1, wherein a unique identifier is allocated to the data carrier, and wherein the pseudo random numbers of the pseudo random number sequence (RND) have been or are generated on the basis of at least the secret key (K) and the unique identifier (ID) of the data carrier (CK).

5. The method according to claim 1, wherein when the data carrier (CK) is designed as an electronic wallet, a wallet account is set up in the data carrier, and in a credit server (GS) of a background system a shadow account is set up that is allocated to the wallet account, the method further comprising:
   loading the amount of money to the shadow account by storing the pseudo random number sequence (RND) in the credit server (GS).

6. The method according to claim 5, wherein the secret key (K) of the data carrier (CK) has been or is stored in the credit server (GS).

7. The method according to claim 6, wherein the partial amount is disbursed from the data carrier (CK) by means of the pseudo random-number generator (CSPRNG) implemented in the data carrier (CK),
  wherein by using the stored money units and the stored secret key (K), the pseudo random number sequence (RND) is generated and output from the data carrier (CK) and the number of money units which corresponds to the partial amount is deleted in the data carrier (CK), and
  wherein in the credit server (GS) the amount of money which corresponds to the partial amount is debited from the shadow account by deleting or marking as used the pseudo random number sequence (RND) in the shadow account.

8. The method according to claim 5, wherein the secret key (K) is determined by the background system.

9. The method according to claim 5, wherein the secret key (K) is determined by key agreement between the background system and the data carrier (CK).

10. The method according to claim 9, wherein as secret key (K) there is determined a session key according to a key agreement protocol.

11. A data carrier (CK), in which a secret key (K) is stored, and in which a, particularly cryptographically secure, pseudo random-number generator (CSPRNG) is implemented, by which pseudo random numbers can be generated on the basis of at least the secret key (K), the data carrier (CK) comprising:
  a processor;
  a computer storage device having stored thereon computer executable instructions that when executed by the processor cause the data carrier to perform the following:
    determine an amount of money to be represented by a pseudo random number sequence (RND);
    generate, by the cryptographically secure, pseudo random-number generator (CSPRNG), the pseudo random number sequence (RND), wherein the pseudo random number sequence (RND) is generated based on at least one secret key (K), such that the secret key (K) is provided to the CSPRNG as at least one initial value for generating the pseudo random number sequence RND, wherein the amount of money is represented by a predetermined number of money units, each individual money unit of the predetermined number of money units equaling a given sub-amount of the amount of money such that totaling each of the individual money units together equals the amount of money and the pseudo random number sequence (RND) includes an array of pseudo random numbers equal in amount to the number of money units;
    generate each section of the array of pseudo random numbers by placing a pseudo random number representing each individual money unit of the predetermined number of money units into a given slot of the array that corresponds to the sub-amount of each individual money unit;
    load the amount of money to the portable data carrier (CK) by so storing the predetermined number of money units and the secret key (K) in the portable data carrier (CK); and
    interact with a background system comprising a credit server (GS) such that when the data carrier (CK) is designed as an electronic wallet, a wallet account is set up in the data carrier (CK), and in the credit server (GS) a shadow account is set up that is allocated to the wallet account, and the amount of money is loaded to the shadow account by storing the pseudo random number sequence (RND) in the credit server (GS).

12. The method of claim 1, wherein the cryptographically secure, pseudo random-number generator (CSPRNG) that generates the pseudo random numbers on the basis of at least the secret key (K) is implemented in the data carrier.

* * * * *